United States Patent
Osten et al.

(10) Patent No.: US 6,519,663 B1
(45) Date of Patent: Feb. 11, 2003

(54) SIMPLE ENCLOSURE SERVICES (SES) USING A HIGH-SPEED, POINT-TO-POINT, SERIAL BUS

(75) Inventors: Thomas James Osten, Rochester, MN (US); Delbert Raymond Cecchi, Rochester, MN (US); Gregory Scott Still, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/481,537

(22) Filed: Jan. 12, 2000

(51) Int. Cl.$^7$ ............................................... G06F 13/00
(52) U.S. Cl. ........................ 710/100; 713/323; 709/203
(58) Field of Search ................. 710/100; 713/300–340; 709/203

(56) References Cited

U.S. PATENT DOCUMENTS 5,838,073 A * 11/1998 Khosrowpour et al. ........ 307/2
6,199,130 B1 * 3/2001 Berglund et al. ........... 710/100
6,351,819 B1 * 2/2002 Berglund et al. ........... 709/203
2002/0043877 A1 * 4/2002 Mullins et al. .............. 307/31

OTHER PUBLICATIONS

"Next Generation I/O: A New Approach to Server I/O Architectures" a technical white paper, 12 pages, Feb. 1999.
"system I/O" InfinBand$^{SM}$ Trade Association, 3 pages, Jan. 3, 2000.
"Future I/O and Next Generation I/O Merge", 3 pages, Aug. 31, 1999.

* cited by examiner

*Primary Examiner*—Rupal Dharia
(74) *Attorney, Agent, or Firm*—Christopher H. Lynt; Matthew J. Bussan (57) ABSTRACT

Enclosure services in a computer system having a Host computer and at least one Target device, are provided on a functional path, which is preferably a relatively high-speed, point-to-point serial bus between the Host computer and the at least one Target device. The at least one Target device and the Host computer each have a full power operational mode and an auxiliary power mode. The Host computer generates enclosure services commands and sends them to the at least one Target device on the functional path. The at least one Target device can receive and respond to the enclosure services commands, even when in the auxiliary power mode.

34 Claims, 5 Drawing Sheets

SIMPLE ENCLOSURE SERVICES (SES) USING A HIGH-SPEED, POINT-TO-POINT, SERIAL BUS

BACKGROUND OF THE INVENTION

1. Field of the Invention

The invention relates to the field of computer system maintenance and management, and in particular, to a way of providing enclosure services over a high-speed, point-to-point serial bus.

2. Background Information

The computer industry is presently expanding on approaches for providing system enclosure services in computer systems. As is generally understood in the art, system enclosure services, or simply enclosure services, refers to a number of computer system enclosure maintenance and management/control functions. Enclosure services includes a group of related functions aimed at managing the enclosure environment. These functions include, for example, sensing and controlling power and cooling apparatus, but may also include such functions as managing vital product data (VPD) information, that is, information about what devices are installed and where, within the computer system.

Enclosure services are generally provided by enabling low-level communication paths inside a computer enclosure and between computer enclosures, in the case of a computer system with multiple enclosures.

In the industry today, for simple system enclosure services, there are primarily two architectures done over functional I/O (input/output) bus paths. One is the American National Standard for Information Systems-System Enclosure Services (ANSI-SES). ANSI-SES provides for Small Computer System Interconnect (SCSI) access to system services, i.e., power, cooling, indicators, etc., within an enclosure containing one or more SCSI devices, e.g., direct access storage devices (DASD's-disk drives). This standard is described in the working draft entitled "SES SCSI Enclosure Services," X3T10/Project 1212-d/Rev 8a, Jan. 18, 1997. SCSI is a well known bus standard. In this disclosure, ANSI-SES may be referred to hereafter as simply 'SES'.

The other primary architecture is called SFF 8067 (Small Form Factor) which runs across the standard FC-AL (Fiber Channel-Arbitrated Loop) bus.

Also, formerly under development was a serial I/O bus and protocol called 'FutureIO' (FIO). The FIO bus was a proposed industry standard I/O bus being developed by IBM (IBM is a trademark of International Business Machines Corporation), HP, Compaq, 3COM, Adaptec and CISCO, that would operate at the relatively high speed of 1.25 GHz.

One proposed use of FIO was as a competitive alternative bus attachment for Server I/O expansion boxes, such as SCSI JBOD (Just-a-Bunch-Of-DASD) boxes; FC-AL (Fibre Channel Arbitrated Loop) JBOD boxes; and BOS (Box-Of-Slots) I/O Adapter boxes.

Also formerly under development was an I/O bus promoted by INTEL and others (Dell, Hitachi, NEC, Siemens and Sun Microsystems, etc.) called NGIO (Next Generation I/O). Next Generation I/O architecture was a channel-oriented, switched fabric, serial point-to-point link architecture aimed at meeting the growing needs of I/O reliability, scalability and performance on servers (see, for example, "Next Generation I/O: A New Approach to Server I/O Architectures" a technical white paper, February 1999 available from the NGIO Forum at http://www.ngioforum.org/events/02991357.html).

Recently the best ideas in the FIO and NGIO bus architectures were merged into one specification by server and peripheral vendors. The new system I/O fabric is called InfinBand[SM] and features a channel-based, switch fabric design that delivers a unified architecture and protocol. This new system I/O will provide an unprecedented range of performance for entry-level servers through high-end data-center class solutions using interoperable links with a choice of bandwidths (0.5 to 6 Giga-Bytes per second) and bus widths (1×=4 wire "width", 4×=16 wire "width" and 12×=48 wire "width"). Additional information may be found at the web sites of the InfinBand[SM] Trade Association (www.infinibandta.org) and the system I/O group (www.sysio.org).

However, the above-mentioned system bus advances do not address the continued need for simple enhanced enclosure services methods.

Presently, more sophisticated forms of box-to-box enclosure services are normally achieved using a separate cable and bus (like RS485). The IBM AS/400 SPCN (System Power Control Network) and Intel's IPMI (Intelligent Platform Management Interface) are examples of this (AS/400 is a trademark of International Business Machines Corporation). A system power control network (SPCN) is disclosed in U.S. Pat. No. 5,117,430, and in copending application Ser. No. 08/912,561, filed Aug. 18, 1997, entitled "FAIL-SAFE COMMUNICATI/ONS NETWORK FOR USE IN SYSTEM POWER CONTROL", which are assigned to the same assignee as the present application. The SPCN communications network is a low volume serial network used to monitor and control power conditions at a plurality of nodes in a computer system, for example, the IBM AS/400. The nodes typically include microprocessors which monitor the status of, and make occasional adjustments to, the power conditions at the respective nodes. A heterogeneous system enclosure services implementation is disclosed in commonly assigned copending application Ser. No. 09/267,778, filed Mar. 15, 1999, entitled "HETEROGENEOUS SYSTEM ENCLOSURE SERVICES CONNECTION."

In addition to their rich function, a primary consideration and justification for basing more elaborate enclosure services on a separate bus and interface, such as the SPCN, is that the investment for this architecture does not have to be repeated for each type of I/O expansion bus that comes along or is available. On the other hand, the rationale behind simple forms of enclosure services is to decrease base homogeneous system costs, and to allow for standardization to enable a minimal set of heterogeneous enclosure services commands.

Most elaborate enclosure services implementations today are proprietary, so heterogeneous communication protocols are not available. Although the above-mentioned copending application Ser. No. 09/267,778, discloses a method and apparatus for a heterogeneous system enclosure services connection solution, other solutions are also needed.

One significant drawback of simple methods-such as ANSI-SES is that it cannot do Server I/O box power control; that is, the powering on and off of Server I/O boxes. The SCSI bus chip-set is designed to run using full power. Therefore, a power on command cannot be received and acted on by a powered off Server I/O box.

FC-AL 8067 also cannot do box power control because the critical interface link path is through the DASD to the box, and is possible only after the FC-AL DASD has full operational power.

There is also known so-called Wake-On-LAN (WOL) technology. Present WOL design allows remote Server boxes to be powered on (i.e., 'Wake-Up') but cannot be used to power the box off (the box 'goes-to-sleep' automatically after a preset period of inactivity).

Thus, presently there is no high-speed serial bus that enables a node to receive and respond to simple commands or to generate alerts after dropping into a minimal power draw mode (auxiliary power). Such an arrangement is needed to provide the Operating System (OS) with the, capability of confirming, among other things, that a device is physically present on the bus. For instance, a command such as the so-called 'Are-You-There'command, is a necessary prerequisite before determining that a device is in a low-power state, or for general hardware resource management.

Therefore, there is a need for a high-speed serial bus arrangement with the ability to have a node drop into a minimal power draw (auxiliary power only) while still maintaining a physical and logical connection mechanism.

A need exists for a way to provide system enclosure services over the functional path, and at the same time allow some control, response, and alerting mechanisms, when the Target device is only running on auxiliary power.

As discussed above, 'over-the-functional-path' control can advantageously allow heterogeneous system platforms to perform basic enclosure services, and to enable a very low power management mode, in a specified manner. Out-of-band (using a separate path) hardware and software mechanisms, such as SPCN and IPMI, may not be appropriate for simple heterogeneous JBODs and BOS applications due to extra code overhead, code incompatibilities, and extra cabling costs, for example.

Different system vendors have established necessarily complex and costly home-grown architectures to handle homogeneous enclosure services that are unique to their individual brands. Therefore, there is a need for a simple method to allow simple heterogeneous enclosure services commands between different brands.

As discussed above, at present there are no solutions to these problems in the marketplace. The InfinBand$^{SM}$ Trade Association system I/O group is presently pursuing a path for simple enclosure services that is limited to Power-On/Off, and perhaps a different method for detecting 'Are-You-There'. The design for those methods is not clearly defined, but it is clear that it does not allow for responses from the Target platform to indicate or confirm a un-powered connection, alerts, failure modes, and/or controlling a Target LED when the Target device is connected to auxiliary power (i.e., minimally-powered).

Therefore, a need exists for a way to provide simple enclosure services over a high-speed, point-to-point, serial bus, which overcomes the limitations of conventional and known systems and methods.

SUMMARY OF THE INVENTION

It is, therefore, a principle object of this invention to provide enclosure services over a high-speed, point-to-point, serial bus functional path cable.

It is another object of the invention to provide a method and apparatus that solves the above mentioned problems so that simple heterogeneous enclosure services commands can be used between different brands, and so that system enclosure services can be provided over the functional path while at the same time allowing some control, response, and alerts, when the Target device is only running on auxiliary power.

These and other objects of the present invention are accomplished by the method and apparatus disclosed herein.

According to an embodiment of the invention, a method of doing simple and specific enclosure services across a copper high-speed point-to-point serial bus, such as the InfinBand$^{SM}$ (IB) is provided.

According to an embodiment of the invention, a way is provided for maintaining a minimum enclosure services connection at both ends of a high speed point-to-point serial link which also enables very low power consumption at the minimally-powered end.

According to an embodiment of the invention, a future simple enclosure services (sES) improves on the prior forms of enclosure services, such as ANSI-SES and SFF 8067, by enabling a form of simple system power control of IB attached Server I/O expansion boxes.

Advantageously, according to an aspect of the invention, the functional path is used for providing enclosure services requiring no extra wires, and only a small amount of power, called Auxiliary (Aux) power, is required.

According an aspect of the invention, this method provides an enclosure services interconnect method for simple JBOD and BOS attachments for the IB links.

These and other aspects of the invention will become apparent from the detailed description set forth below.

BRIEF DESCRIPTION OF THE DRAWINGS

FIG. 1 illustrates an adapter and a power supply, along with a auxiliary power supply inside a Target System, according to an exemplary embodiment of the present invention.

FIG. 2 illustrates a how a command is sent, received, and translated in a Target server chassis according to an exemplary embodiment of the invention.

DETAILED DESCRIPTION OF THE PREFERRED EMBODIMENT(S)

The invention will now be described in more detail by way of example with reference to the embodiment(s) shown in the accompanying figures. It should be kept in mind that the following described embodiment(s) is/are only presented by way of example and should not be construed as limiting the inventive concept to any particular physical configuration.

Figure 1A:
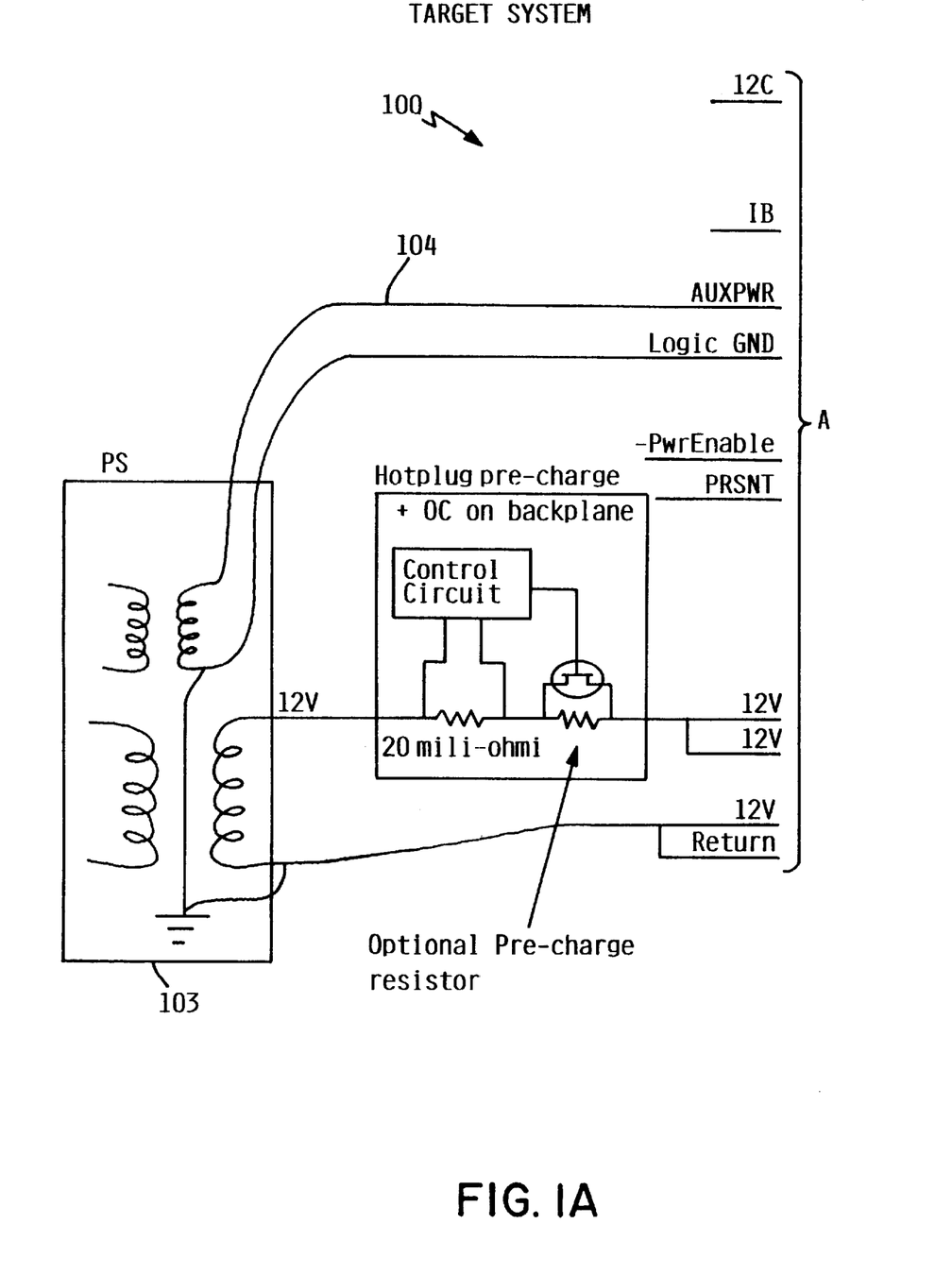
Figure 1B:
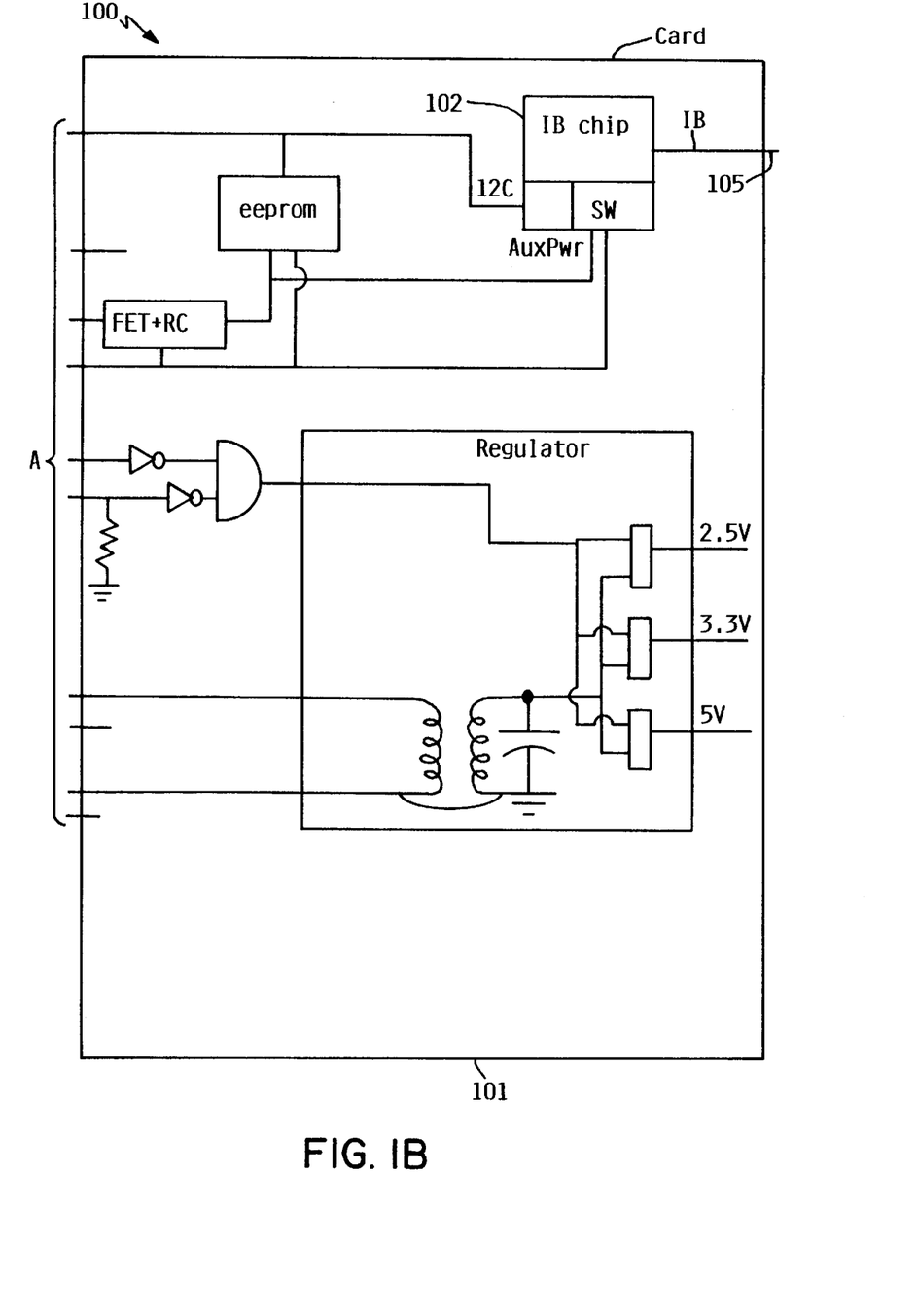

FIG. 1 illustrates an exemplary Target System 100 provided with a IB adapter card 101 having an IB chip 102. A power supply (PS) 103, including auxiliary power (AUX PWR)104, is also disposed inside the Target System 100, according to an exemplary embodiment of the invention. It may be noted that auxiliary power supplied to a generic I/O card (and therefore, also an IB card) usually should not exceed about 1 to 2 watts. It thus follows that when operating on auxiliary power, signaling on the high-speed bus is constrained by the lower available power. Therefore, signals on the high-speed bus will be sent using a relatively lower frequency when in the auxiliary power mode as compared with the full power mode, or, if sent at high-frequency, the power spectrum must be minimized, so that the power constraints are not exceeded.

The IB 105 coming into the IB Card 101 is coming from another IB chip in a different, Host system box (not shown in FIG. 1), for example. The elements illustrated in FIG. 1 can be viewed as existing inside any Target system, such as a Target JBOD Oust a bunch of DASD) or BOS (Box-Of-Slots) box, for instance.

An 'in-band', i.e., using the normal IB protocol and structure, command (sES command) would be formulated by the Host and sent across the IB bus wires 105 to the IB chip 102 known to exist in the Target system, as will be described below with reference to FIG. 2.

Figure 2A:
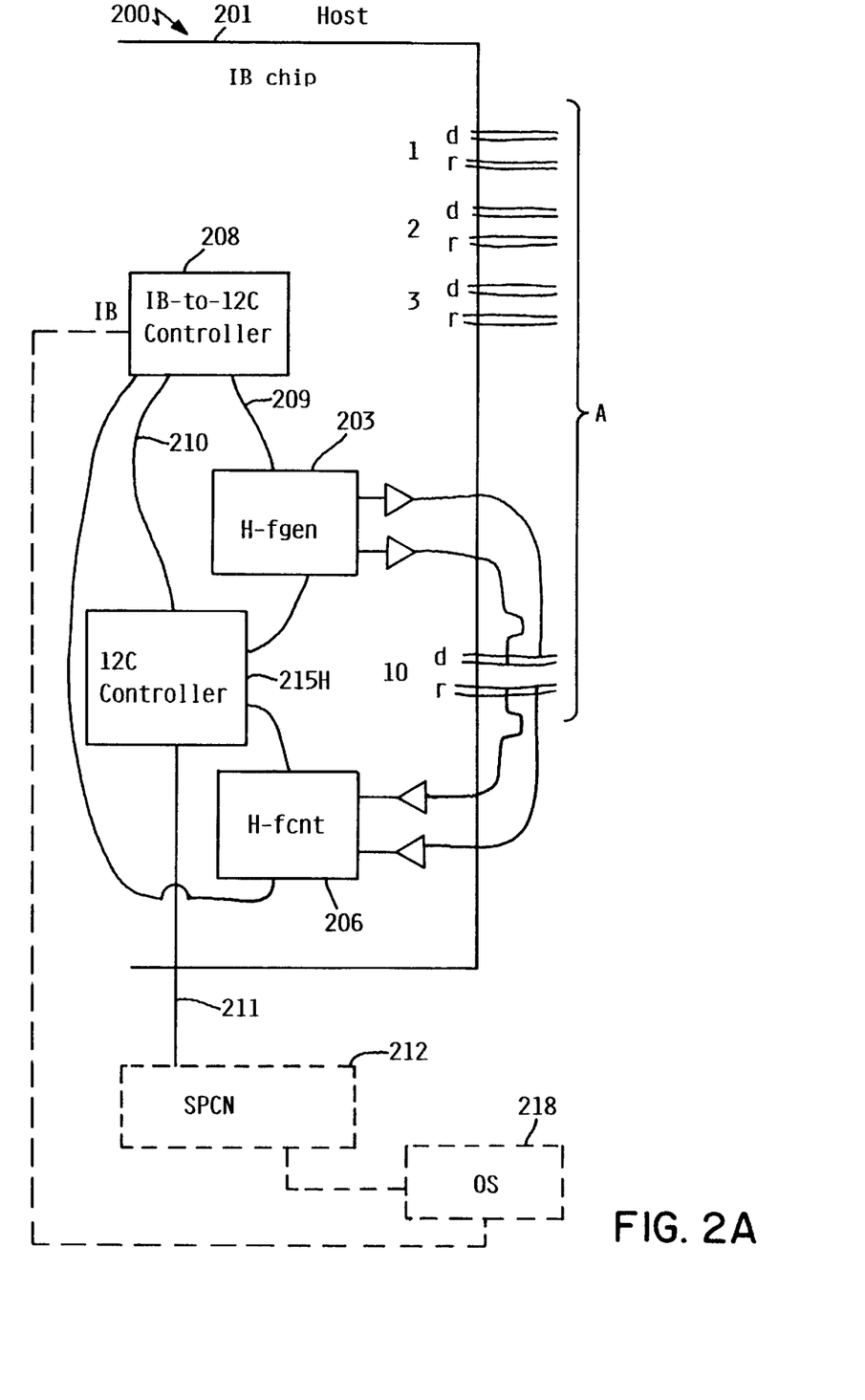
Figure 2B:
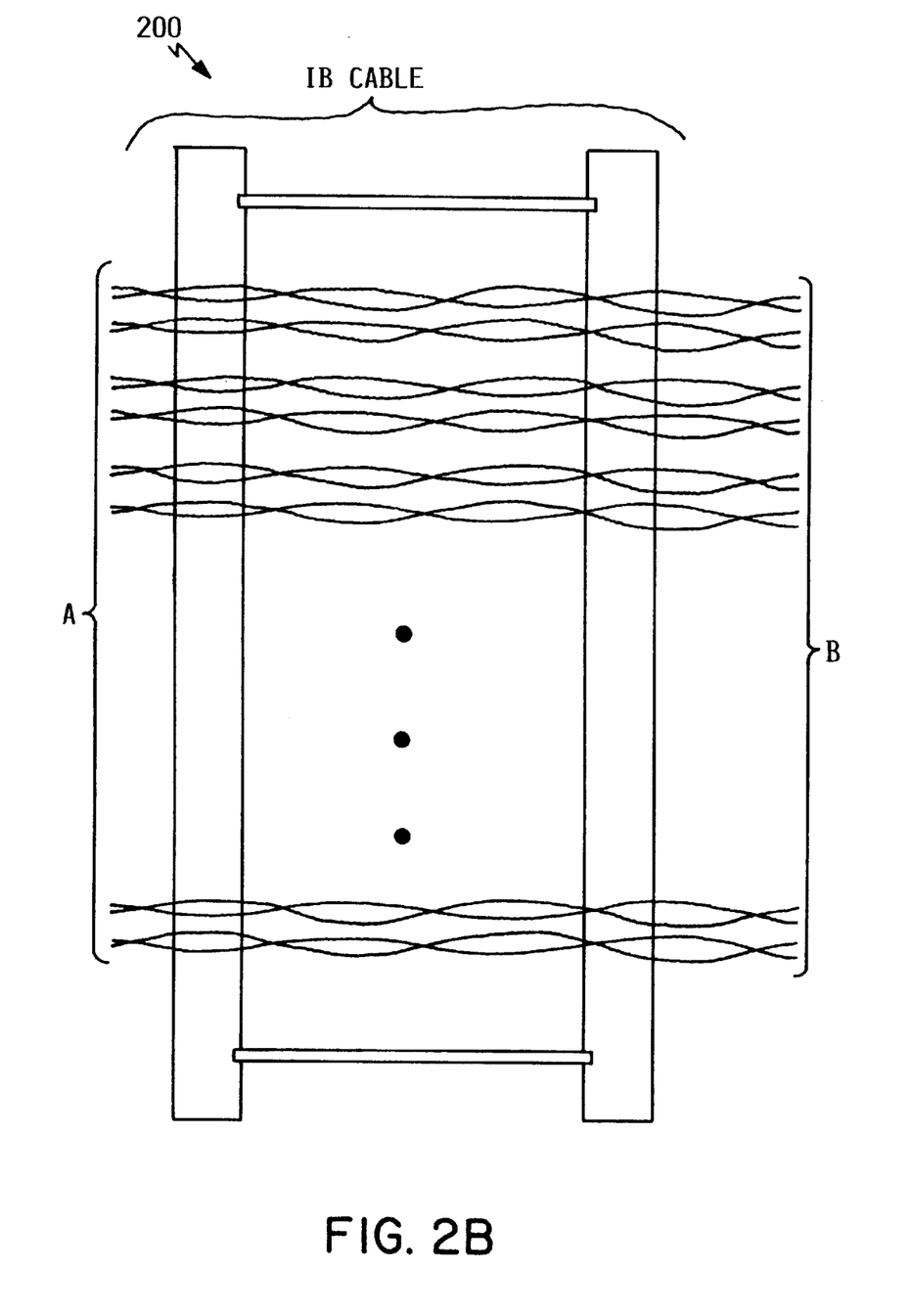
Figure 2C:
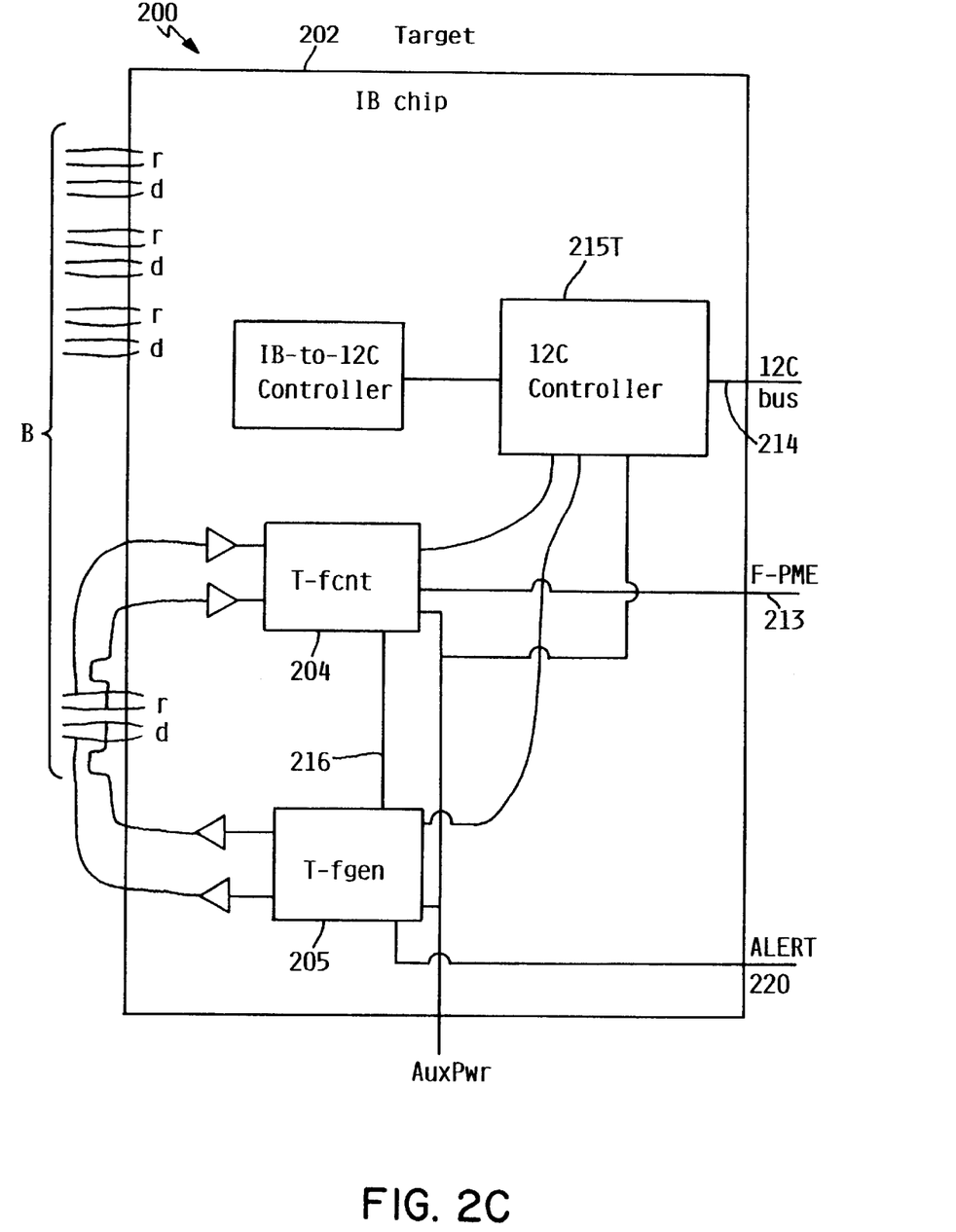

FIG. 2 illustrates how an IB-sES command is sent, received, and translated, according to an exemplary embodiment of the invention. Enclosure services in a computer system 200 having a Host computer (HOST) and at least one Target device (TARGET), are provided on a functional path (IB), which is preferably a relatively high-speed, point-to-point serial bus between at least one Host computer chip (201) and the at least one Target device chip (202). The at least one Target device chip (202) and the at least one Host computer chip (201) each have a full power operational mode and an auxiliary power (AuxPwr) mode. This is represented for the Target IB chip 202 by the AuxPwr line.

AuxPwr for the Host is similarly connected but not shown. It should be noted that at the Host end, a system power control network block (SPCN) 212 is shown, as is an operating system block (OS) 218. When the Host is operating on auxiliary power, the operating system 218 is not running, however, the system power control network (SPCN) 212 is fully operational. Therefore, when the Host is operating on auxiliary power, the IB-sES control is implemented through SPCN 212, as will be described further below. When the Host is operating on full power, the IB-sES control may be implemented through SPCN 212, or in other ways, as will be described below with reference to FIG. 2.

The Host computer chip (201) generates enclosure services commands and sends them to the at least one Target device chip (202) on the functional path wires (IB). The at least one Target device chip (202) can receive and respond to the enclosure services commands when in the auxiliary power mode.

Alerts coming from either alert signal line 220, or Target I2C bus 214, can be loaded into T-fgen 205 and sent back to the Host computer chip 201. Alerts may be, for example, wake-up requests sent from the Target to the Host requesting permission for the Target system to 'wake-up.' An intrusion alert could be generated in response to the opening of the target cover or the attempted removal of a DASD, for example.

In FIG. 2, the Host IB chip 201 and Target IB chip 202 are shown connected by a multiple-wire-pair point-to-point connection (e.g., IB), however, the invention is not necessarily limited to such an interconnection configuration. That is, another bus type could be used within the spirit and scope of the invention, as would be readily apparent to one skilled in the art.

With reference to the exemplary embodiment of FIG. 2 in more detail, an IB command/data formulated in the Host by a respective Host Operating System (OS) 218, e.g., an sES (simple system enclosure services) command, loads 'frequency' data in the Host-frequency-generator (H-fgen) 203. This command/data could be loaded in at least the following ways:

(a) directly (209) from the functional (in-band) path 208, in this case IB;

(b) indirectly (210) through IB to the I2C Controller stage (215H); or (c) through a separate 'out-of-band' path (211), such as IPMI or SPCN (212).

Advantageously, as noted above, when the Host is operating in the auxiliary power mode, the loading would be accomplished through the fully operational SPCN 212. When the Host is fully powered, loading can be through the other described paths.

H-fgen 203 then uses the command/data to generate a relatively low-speed frequency to the Target frequency detector, e.g., a counter (T-fcnt) 204. The T-fcnt 204 will then initiate a Target command and/or response. Note that F-PME (Power Management Enable) 213 is drawn as an analogy that would conform to the ACPI (Advanced Configuration and Power Interface) specification. Alternatively, this signal (or the I2C bus 214 via I2C controller 215T) can be used to power-on the Target system, for instance.

Another alternative for powering-on the Target system would be via the alert signal line 220. This alert signal 220 is loaded into the T-fgen 205 and sent to the Host H-fcnt 206. If the Host determines that the request for powering-on of the Target system should be granted, a power-on command can be loaded into the H-fgen 203 and sent to the Target T-fcnt 204. An alert signal could arise in the Target in response to a keypad entry, a chassis intrusion, or a signal from a WOL card, for example.

It should be noted that a frequency generator and counter arrangement is shown as an exemplary embodiment, and it is contemplated that an sES command, response, or alert, may be signaled by a 'raw' frequency or by a frequency 'code', e.g., a particular series of pulses of a particular frequency or frequencies. The detectors (H-fcnt and T-fcnt) thus could be simple counters which count the number of pulses received in a particular time period, or more sophisticated frequency detector circuitry, as would be apparent to one skilled in the art. Of course, as already mentioned, when in the auxiliary power mode, the power available constraints must be adhered to in any signaling arrangement. That is, any signaling is acceptable so long as the average power in the signal can be accommodated by the minimal power available from the auxiliary power source.

One exemplary (simple) protocol for communication between the Host and the Target (or Target to Host in the case of an alert originated in the Target) could use just one drive/receive set of 'X' differential wire pairs (that is, four wires) of the cabled communication path (IB), as is shown in FIG. 2. In this case, the differentiation in commands and responses can be discerned by changing frequency. This will be referred to as the 'Frequency Spectrum' (FS) method herein. Below are listed a few possible state commands for an FS method. These will only be written and are valid when a Target system is running only off its auxiliary power. When main power is available to the Target, then any sES commands (including power-off) can be done 'in-band', i.e., using the normal IB protocol and structure.

As main power is disconnected from any IB chip, a hardware mechanism (e.g., SW in chip 102 in FIG. 1) or the like, would automatically switch chip power to the isolated AuxPwr source. To send the command, or receive responses or alerts, Host and Target chip ports can either be running off main power or AuxPwr.

A few possible state commands for the exemplary FS method are now listed:

| | |
|---|---|
| 1. Send_1 KHz_power_up | ; 1 KHz power-up command switches the Target power source from AuxPwr to normal 'main' power. |
| 2. Send_2KHz_Are_You_There | ; 2KHz wrap may close switch in Target IB chip to wrap 2KHz back to H-fcnt (illustrated as line 216). Otherwise the I2C Controller may generate the 2Khz to T-fgen. This command detects whether a cable physically connects two systems. This is useful to detect 'cable-presence', maintain Operating System awareness of the powered off box and thereby enabling very low power (AuxPwr only) forms of Power Management. |
| 3. Send_4KHz_10X/sec_Identify_Flash_On | ; 4KHz lights the chassis Identify LED for the IB bus adapter slot through the 12C bus |
| 4. Send 8KHz_1OX/sec_Identify_Flash_Off | ; 8KHz turns off Identify LED |
| 5. Read_H_fcnt_response | ; 1KHz read means power-up successful; 2KHz read means cable is plugged; 4KHz read means bus-adapter slot chassis LED is on; 8KHz read means bus-adapter slot chassis LED is off; 16KHz read means power fault or alert detected; 32KHz read means cooling fault or alert detected ; 64KHz read means Target wake-up request alert ; 128KHz read means specific other alert |

The above commands and the frequencies specified are presented by way of example only. The actual frequencies used may differ to accommodate the particular signaling design of the relatively high-speed point-to-point serial bus functional path. For instance, an sES command sent on an AC-coupled IB path may need to contain higher frequency components than a DC-coupled IB path, as would be recognized by one skilled in the art.

One alternative design and protocol also contemplated would be to transmit different commands, responses and alerts, by using multiple drive/receive sets of differential pairs of wires of the IB bus, and multiple or multiplexed versions of Hgen, Hcnt, Tgen, and Tcnt, using only one frequency. This alternative method will be referred to herein as the Static Frequency (SF) method. For instance, in this method the power-up command could be sensed and received on drive/receive set of differential wire pairs #1 and the 'Are-You-There' command could separately use set #2, and so on. An explicit illustration of the IB chip connections is not believed necessary for a complete understanding of this alternative method by one skilled in the art.

Alternatively, a 'Mixed-Method' (MS) could be used, wherein combinations of the previous two methods are employed. For instance, a command could be issued on set #1 and responses are received on set #2, and this will be referred to as method 'MS1'. On the other hand, a combination of FS and SF could be employed, and this will be referred to a method 'MS2'. An explicit illustration of the IB chip connections is not believed necessary for a complete understanding of these alternative methods MS1 and MS2 by one skilled in the art.

It is noted that one advantage of using all wire-pairs for low-speed enclosure services would be that the design could more naturally balance all pairs' electrical properties and parametrics for in-band (i.e., using the normal protocol and structure) high frequency signaling.

On the other hand, one advantage of using only one set of drive/receive differential wire pairs (the first described, FS, approach) would be a reduction in the complexity of the hardware and software design. Another advantage would be that this design is theoretically inter-operable in that it allows a low-cost, single wire-pair set high speed bus to interconnect with a multi-pair high speed bus. For instance, it may be desirable to interconnect a high-speed adapter, that uses all parallel differential pairs with a low-speed function that utilizes only one pair, and vice-versa.

Of course, with any of these methods, the average power drawn during the sES protocol must be under the power available from the auxiliary power supply. Therefore, the available power in the auxiliary power mode may be a design factor affecting the choice of which signaling arrangement is used., as would be apparent to one skilled in the art.

As noted earlier, conventional ANSI-SES cannot do Server I/O box power control because the SCSI bus and chip-set are designed to run off full power. FC-AL 8067 also cannot do box power control because the critical interface link path is through the DASD to the box and is possible only after the FC-AL DASD has full operational power. However, according to an embodiment of the invention described above, a method of doing simple and specific enclosure services across a copper high-speed point-to-point serial bus, such as the lnfinBand$^{SM}$ (IB) is provided.

The simple enclosure services (sES) according to the present invention enhances these attempts at providing enclosure services over the functional path because it allows some control, response, and alert mechanisms, when the Target (and/or the Host) is only running on auxiliary power.

The sES design disclosed herein also provides an enhancement to the present Wake-On-LAN (WOL) technology. Present WOL design allows remote Server boxes to be powered on (i.e., 'Wake-Up') but cannot be used to power the box off—in WOL, the box 'goes-to-sleep' automatically after a preset period of inactivity. Also, since this design includes an alerting mechanism, as described above, via the 12C bus or separate alert signal, a wake-up request signal from a local (in Target) WOL card, or keypad, for example, can be propagated to the Host system.

This form of 'over-the-functional-path' control and 'sensing' according to the present invention allows heterogeneous system platforms to perform basic enclosure services using minimal power and enables a very low power management mode, in a specified manner. As already mentioned, out-of-band hardware and software mechanisms, such as SPCN and IPMI, may not be appropriate for simple heterogeneous JBODs and BOS applications due, for example, to extra code overhead, code incompatibilities, and extra cabling costs, for example. Different system vendors have established necessarily complex and costly home-grown architectures to handle homogeneous enclosure services that are unique to their individual brands. However, the present invention, as described above by way of exemplary embodiments, provides a simple method which allows simple heterogeneous enclosure services commands, responses, and alerts among brands.

The invention may be at least partially embodied as a computer program product. A computer program product includes a recording medium, such as a floppy disk, a high-capacity read only memory in the form of an optically read compact disc or CD-ROM, a tape, a transmission type media, such as a digital or analog communications link, or a similar computer program product.

It will be apparent to one skilled in the art that the manner of making and using the claimed invention has been adequately disclosed in the above-written description of the preferred embodiment(s) taken together with the drawings.

It will be understood that the above described preferred embodiment(s) of the present invention are susceptible to various modifications, changes, and adaptations, and the same are intended to be comprehended within the meaning and range of equivalents of the appended claims.

Further, although a number of equivalent components may have been mentioned herein which could be used in place of the components illustrated and described with reference to the preferred embodiment(s), this is not meant to be an exhaustive treatment of all the possible equivalents, nor to limit the invention defined by the claims to any particular equivalent or combination thereof. A person skilled in the art would realize that there may be other equivalent components presently known, or to be developed, which could be used within the spirit and scope of the invention defined by the claims.

What is claimed is:

1. A method of providing enclosure services in a computer system having a host computer and at least one target device, the computer system having a functional path in the form of a relatively high-speed, point-to-point serial bus between the host computer and the at least one target device, the at least one target device and the host computer each having a full power operational mode and an auxiliary power mode, the method comprising:
    operating the at least one target device in the auxiliary power mode;
    generating an enclosure services command in the host computer;
    sending the enclosure services command to the at least one target device on the functional path relatively high-speed, point-to-point serial bus, from the host computer to the at least one target device;
    while the at least one target device is in the auxiliary power mode, receiving the enclosure services command with the at least one target device.

2. The method according to claim 1, wherein the functional path relatively high-speed, point-to-point serial bus has a plurality of differential wire pairs, and wherein the sending the enclosure services command to the at least one target device on the functional path relatively high-speed, point-to-point serial bus, from the host computer to the at least one target device comprises:
    using only one differential wire pair of the plurality of differential wire pairs of the functional path relatively high-speed, point-to-point serial bus.

3. The method according to claim 2, wherein the using only one differential wire pair comprises:
    changing frequency to differentiate among enclosure services commands.

4. The method according to claim 3, wherein the method further comprises returning at least one command response from the at least one target device to the host computer on the functional path relatively high-speed, point-to-point serial bus.

5. The method according to claim 4, wherein the returning at least one command response from the at least one target device to the host computer on the functional path relatively high-speed, point-to-point serial bus, comprises:
    using only one differential wire pair of the plurality of differential wire pairs of the functional path relatively high-speed, point-to-point serial bus for command responses.

6. The method according to claim 5, wherein the using only one differential wire pair for command responses comprises:
    changing frequency to differentiate among enclosure services command responses.

7. The method according to claim 6, wherein each enclosure services command has a respective unique frequency associated therewith, and wherein the returning at least one command response from the at least one target device to the host computer on the functional path relatively high-speed, point-to-point serial bus comprises:
    returning a command response using the respective unique frequency associated with the respective command to indicate one of an affirmative response, a fault condition, or a negative response; and
    returning a command response using a different frequency than the unique frequency associated with the respective command to indicate one of a negative response, an affirmative response, or a fault condition in the at least one target device.

8. The method according to claim 7, wherein the generating the enclosure services command comprises generating one of:
    a power up command for commanding the at least one target device to switch from auxiliary power operation to full power operation;
    an Are-You-There command for detecting the presence of the at least one target device on the functional path;
    a bus adapter slot light on command for turning on a light disposed on a bus adapter slot at the at least one target device; and
    a bus adapter slot light off command for turning off a light disposed on a bus adapter slot at the at least one target device.

9. The method according to claim 1, wherein the functional path relatively high-speed, point-to-point serial bus has a plurality of differential wire pairs, and wherein the sending the enclosure services command to the at least one target device on the functional path relatively high-speed, point-to-point serial bus, from the host computer to the at least one target device comprises:
    sending a single frequency signal on selective ones of the differential wire pairs of the plurality of differential wire pairs of the functional path relatively high-speed, point-to-point serial bus, to differentiate between commands.

10. The method according to claim 1, wherein the functional path relatively high-speed, point-to-point serial bus has a plurality of differential wire pairs, the method further comprising:
    returning at least one command response from the at least one target device to the host computer on the functional path relatively high-speed, point-to-point serial bus;
    wherein the sending the enclosure services command to the at least one target device on the functional path relatively high-speed, point-to-point serial bus, from the host computer to the at least one target device comprises using a first differential wire pair of the plurality of differential wire pairs of the functional path relatively high-speed, point-to-point serial bus; and wherein the returning at least one command response from the at least one target device to the host computer on the functional path relatively high-speed, point-to-point serial bus comprises using a second differential wire pair of the plurality of differential wire pairs of the functional path relatively high-speed, point-to-point serial bus.

11. The method according to claim 10, wherein the sending the enclosure services command and the returning at least one command response comprises:

changing frequency to differentiate among respective enclosure services commands, and among respective enclosure services command responses.

12. A high-speed serial bus arrangement, comprising:

a host system;

at least one target system; and a high-speed serial bus connection between the host system and the at least one target system;

wherein the at least one target system has an auxiliary low-power mode of operation; and wherein the at least one target system has a serial bus interface circuit which is operational to provide a physical and logical connection to the host system on wires of the high-speed serial bus during the auxiliary low-power mode of operation.

13. The arrangement according to claim 12, wherein the host system has command means for generating enclosure services commands and sending the enclosure services commands on the high-speed serial bus to the at least one target system.

14. The arrangement according to claim 13, wherein the command means includes:

power-up means for generating a power-up command to switch the at least one target system from auxiliary low-power operation to full power operation;

are-you-there means for generating an Are-You-There command to detect the presence of the at least one target system if the at least one target system is physically connected to the high-speed serial bus;

identify-flash-on means for generating an identify-flash-on command to turn on a light associated with a target system chassis slot holding the serial bus interface circuit of the at least one target system; and identify-flash-off means for generating an identify-flash-off command to turn off a light associated with a target system chassis slot holding the serial bus interface circuit of the at least one target system; and wherein the at least one target system has:

command response means for sending one of a plurality of responses to the host system on the high-speed serial bus; and alert signal means for sending one of a plurality of alerts to the host system on the high-speed serial bus.

15. A high-speed serial bus protocol method, comprising:

coupling a host system and a target system with a functional path comprising a high-speed, point-to-point, serial bus;

operating the target system in one of a full-power and a low-power mode of operation;

sending enclosure services commands to the target system; and receiving enclosure services responses from the target system regardless of whether the target system is operating in the full-power or low-power mode of operation.

16. The protocol method according to claim 15, wherein there are a plurality of enclosure services commands which are differentiated by frequency.

17. The protocol method according to claim 15, wherein the functional path high-speed, point-to-point, serial bus has a plurality of wires, and wherein there are a plurality of enclosure services commands which are differentiated by which wires of the functional path high-speed, point-to-point, serial bus are energized.

18. The protocol method according to claim 15, wherein the functional path high-speed, point-to-point, serial bus has a plurality of wires, and wherein there are a plurality of enclosure services commands and a plurality of enclosure services responses, the respective commands and respective responses being carried by different wires of the bus, and wherein differentiation among respective commands and among respective responses is done by changing frequency.

19. The method according to claim 1, wherein the at least one target device comprises at least one of:

a computer system;

a JBOD box;

a BOS box; and a JBOD/BOS box.

20. The arrangement according to claim 12, wherein the at least one target system comprises at least one of:

a computer system;

a JBOD box;

a BOS box; and a JBOD/BOS box.

21. A system comprising:

a host computer;

at least one target system;

a point-to-point serial bus providing a functional path between the host computer and the at least one target system;

wherein the host computer includes means for generating enclosure services commands and send the commands to the at least one target system on the serial bus; and wherein the at least one target system includes means for operating in a full-power or in a low-power mode, and for receiving and responding to the enclosure services commands in either operating mode.

22. The system according to claim 21, wherein the at least one target system includes an interface chip, and wherein the means for operating in a full-power or in a low-power mode comprises:

switching means for automatically switching power to an auxiliary power source when main power is disconnected from the interface chip.

23. The system according to claim 22, wherein the switching means comprises a hardware mechanism.

24. The method according to claim 3, wherein the changing frequency comprises using a frequency code.

25. The method according to claim 1, further comprising operating the host computer in the auxiliary power mode, wherein the sending from the host computer to the at least one target device comprises sending while the host computer is in the auxiliary power mode.

26. The system according to claim 12, wherein the host system has an auxiliary low-power mode of operation, and wherein the host system has a serial bus interface circuit which is operational to provide a physical and logical connection to the at least one target system on wires of the high-speed serial bus during auxiliary low-power mode of operation of either the host system and/or the at least one target system.

27. The protocol method according to claim 15, further comprising operating the host system in one of a full-power and a low-power mode of operation, wherein the sending is regardless of whether the host system is operating in the full-power or the low-power mode of operation.

28. The system according to claim 21, wherein the host computer has means for operating in a full-power or in a low-power mode, and wherein the means for generating is functional in either operating mode.

29. The arrangement according to claim 14, wherein one of the plurality of alerts comprises a wake-up request alert whereby the target system can request permission from the host system to transition from an auxiliary power mode of operation to a full-power mode of operation; and wherein the host system has wake-up alert response means for responding to a wake-up request from the target system by one of:
commanding the target system to transition to full-power operation; or
commanding the target system to remain in the auxiliary power mode of operation.

30. The method according to claim 1, wherein the host computer has a system power control network which is fully functional during operation of the host computer in the auxiliary power mode, and wherein the generating an enclosure services command in the host computer comprises generating the enclosure services command with the system power control network when the host computer is in the auxiliary power mode.

31. A method of providing enclosure services in a computer system having a host computer and at least one target device, the computer system having a functional path in the form of a relatively high-speed, point-to-point serial bus between the host computer and the at least one target device, the at least one target device and the host computer each having a full power operational mode and an auxiliary power mode, the method comprising:

operating the at least one target device in the auxiliary power mode;

generating an alert signal in the at least one target device; and sending the alert signal on the functional path relatively high-speed, point-to-point serial bus, to the host computer from the at least one target device.

32. The method according to claim 31, wherein the functional path relatively high-speed, point-to-point serial bus has a plurality of differential wire pairs, and wherein the sending the alert signal on the functional path relatively high-speed, point-to-point serial bus, from the at least one target device to the host computer comprises:

using only one differential wire pair of the plurality of differential wire pairs of the functional path relatively high-speed, point-to-point serial bus.

33. The method according to claim 31, wherein there are a plurality of alert signals possible, including a power fault alert, a cooling fault alert, an intrusion alert, and a wake-up request alert signal whereby the at least one target device can request permission from the host computer to transition from the auxiliary power mode to a full-power mode of operation; and wherein the host computer has wake-up alert response means for either ignoring the wake-up alert request thereby denying the request to transition to full-power mode, or responding to a wake-up request from the at least one target device by one of:
commanding the at least one target device to transition to full-power operation; or
commanding the at least one target device to remain in the auxiliary power mode of operation.

34. An article of manufacture comprising a computer program product, the computer program product comprising means for causing a computer system to implement a method of providing enclosure services according to claim 1.

* * * * *